Nov. 12, 1929.  H. L. VAN VALKENBURG ET AL  1,735,518
VEHICLE SEAT
Filed Jan. 3, 1927    2 Sheets-Sheet 1

INVENTORS.
Herman L. Van Valkenburg
and
BY Swift Miller.
Morsell, Keeney & Morsell,
ATTORNEYS.

Nov. 12, 1929.  H. L. VAN VALKENBURG ET AL  1,735,518
VEHICLE SEAT
Filed Jan. 3, 1927  2 Sheets-Sheet 2
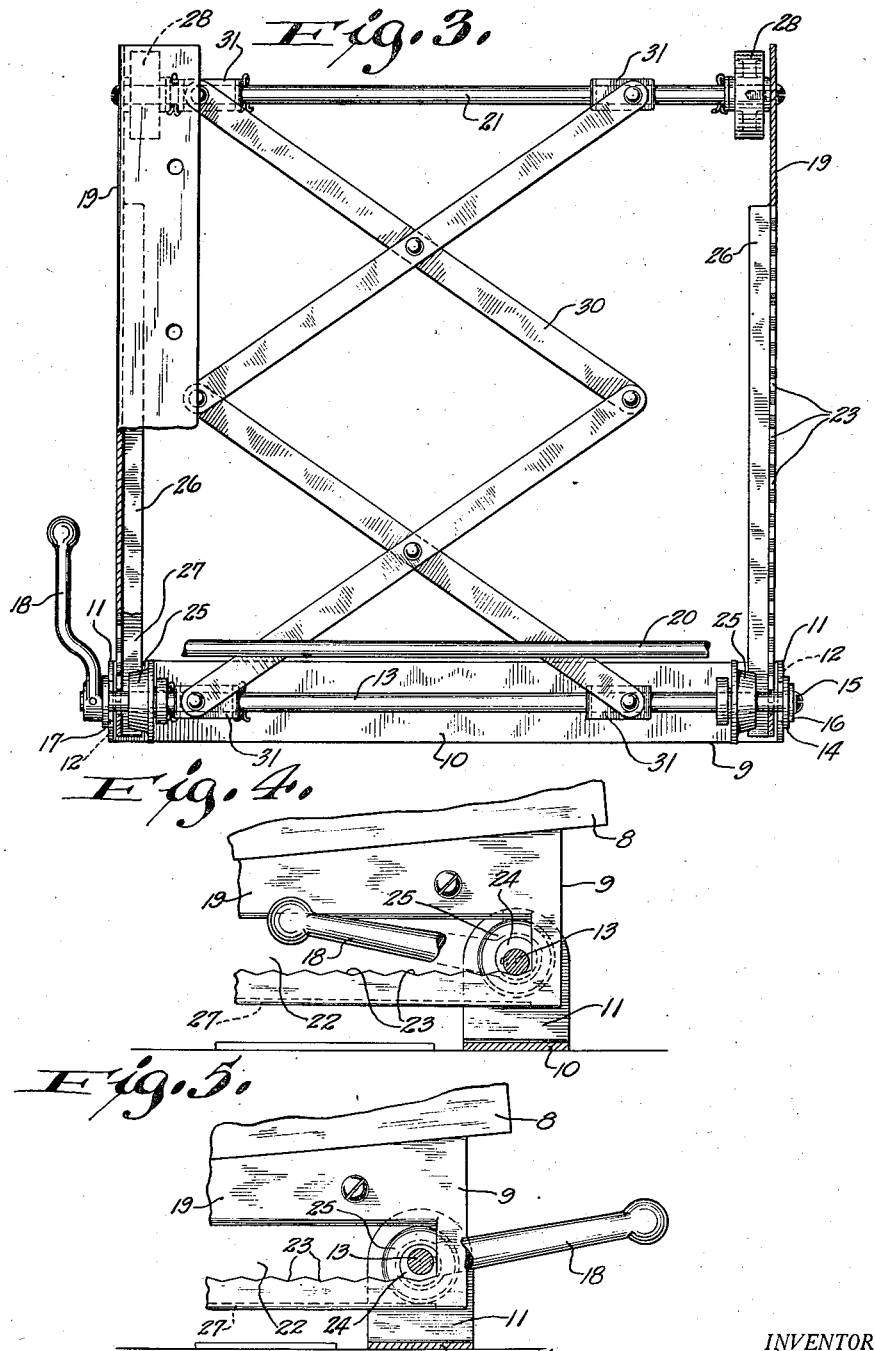
INVENTORS.
Herman L. Van Valkenburg
and
Swift Miller
BY
Morsell, Keeney & Morsell,
ATTORNEYS.

Patented Nov. 12, 1929

1,735,518

UNITED STATES PATENT OFFICE

HERMAN L. VAN VALKENBURG AND SWIFT MILLER, OF WAUWATOSA, WISCONSIN, ASSIGNORS TO THE PARALOCK COMPANY, OF MILWAUKEE, WISCONSIN, A CORPORATION OF WISCONSIN

VEHICLE SEAT

Application filed January 3, 1927. Serial No. 158,669.

This invention relates to improvements in vehicles seats, and more particularly to a slidable and tiltable seat for automobiles.

In recent years the "coach" type of automobile has gained great favor in the automobile industry, but a coach is open to the objection that access to the rear seat can only be gained by the doors which are adjacent the front seat, and the front seat must be tilted, discommoding the occupant thereof, to permit a person to leave or enter the rear compartment of the automobile.

It is one of the objects of the present invention to overcome the afore-mentioned objection by providing an automobile seat which may be moved forwardly while the occupant remains in sitting position whereby free access to the rear seat is permitted.

A further object of the invention is to provide an automobile seat of the class described which is easily operated and may be moved with a parallel motion, and which can be locked in different positions of adjustment.

A further object of the invention is to provide a sliding automobile seat which will not require a modification of the normal construction of the vehicle floor boards and which will not hinder access thereto and removal thereof.

A further object of the invention is to provide a sliding automobile seat which may be tilted forward from normal position, if desired.

A further object of the invention is to provide a sliding vehicle seat which is secured to the vehicle floor at only two points.

A further object of the invention is to provide a sliding vehicle seat having a parallel motion mechanism which, when the seat is slid, prevents the same from binding or moving unevenly.

A further object of the invention is to provide a slidable and tiltable automobile seat which is of very simple construction, is strong and durable, is inexpensive to manufacture, is easily operated, and is well adapted for the purposes described.

With the above and other objects in view the invention consists of the improved automobile seat and its parts and combinations as set forth in the claims, and all equivalents thereof.

In the accompanying drawings in which the same reference characters indicate the same parts in all of the views:

Fig. 3 is a sectional view taken on line 3—3 of Fig. 2;

Fig. 4 is an enlarged fragmentary view showing the seat locking means in one position of adjustment;

Fig. 5 is a similar view showing the locking means in another position of adjustment.

Figure 1:
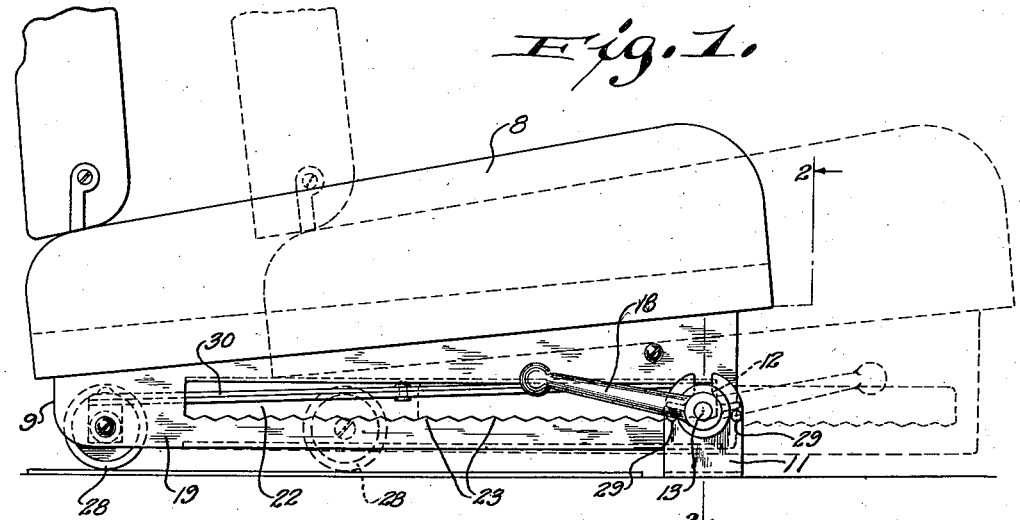
Fig. 1 is a side view of the improved automobile seat, the dotted lines showing the seat in a forward position of adjustment.
Figure 2:
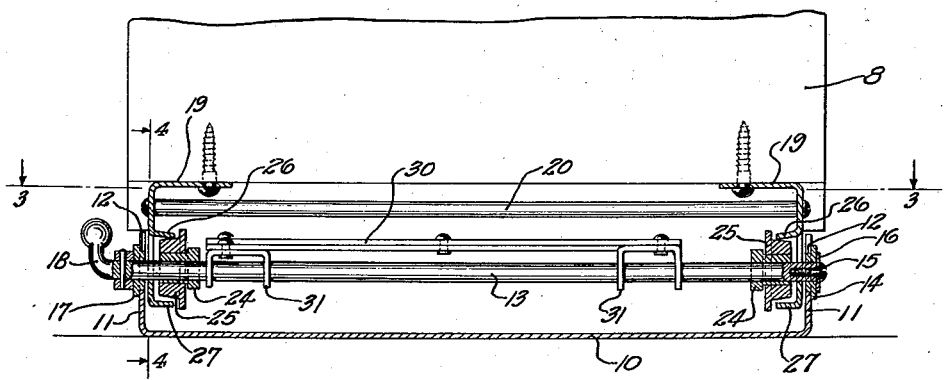
Fig. 2 is a sectional view taken on line 2—2 of Fig. 1.

Referring now more particularly to the drawings it will appear that the stuffed and spring supported portion 8 of the seat is mounted on a slidable seat frame designated generally by the numeral 9.

A bar or strap 10 with upturned end portions 11 is adapted to be secured to the floor of a vehicle. Each end portion 11 is formed with a slotted opening 12 receiving the end portions of a shaft 13. One end portion of the shaft is held against longitudinal movement by a bushing 14 forced into the opening 12, surrounding the shaft end portion, and a screw 15 threaded into the end portion of the shaft. A washer 16 is interposed between the head of the screw and the bushing. The other end portion of the shaft is also surrounded by a bushing 17 which is forced into the opening 12 and exterior thereof a handle or crank 18 is pinned to the end portion of the shaft.

The seat frame 9 is formed of a pair of spaced apart longitudinally extending angle members 19 connected together at their front end portions by a rod 20 and at their rear end portions by a rod or axle 21. Each angle member is formed with a longitudinally extending slot 22 having notches or serrations 23 formed along the lower edge thereof. It should be noted that the angle members 19 are rearwardly inclined so as to give the proper pitch to the frame and seat carried thereby.

The forward end portion of the frame, when in normal position, is supported on said shaft 13, the end portions of which extend through the slots 22 of the angle members 19. The end portions of the shaft 13, inwardly of the angle members, are formed with keyed eccentric portions 24 on which flanged wheels 25 are revolubly mounted, whereby the wheels have an eccentric mounting with respect to the shaft. The wheels are outwardly tapered, as clearly shown in Fig. 3. The angle members 19, adjacent the upper edges of the slots 22, are formed with inwardly projecting, horizontal upper flanges 26 and like lower flanges 27 adjacent the lower edges of said members on which said wheels 25 are adapted to ride. The rear end portion of the seat frame 9 is supported on rollers 28 revolubly mounted on the axle 21.

The seat frame is adapted to move longitudinally over the vehicle floor board and forwardly and rearwardly with respect to the stationary strap 10. The full line showing in Fig. 1 illustrates the seat in its rear position, while the dotted lines show it moved to a forward position. In moving, the rear rollers 28 roll on the floor boards while the flanges 27 roll on the wheels 25. To lock the seat frame in any position of adjustment and against undesired movement, the handle or crank 18 is pivoted from the position shown in Fig. 5 to the reverse position shown in Figs. 1 and 4. The eccentrically mounted wheels 25 will, in this position, cause a raising of the slotted member to engage the serrations 23 with the shaft. Movement of the handle is limited in both directions by pins 29. Due to the taper of the wheels 25 the same engage the flanges 26 and 27 at the inner peripheries of the wheels, and this arrangement, together with the possible flexing of the frame, insures an engagement of the shaft 13 with any of the serrations 23 and does not require extreme accuracy in the formation of said serrations.

To insure a parallel movement of the seat frame and to prevent binding of the parts, a parallel movement mechanism is provided consisting of a lazy tong device 30 secured to the forward shaft 13 and the rear axle 21 of the frame. The end portions of the lazy tong device are provided with brackets 31 slidably mounted on the shaft 13 and axle 21 to permit folding and expanding of the device when the seat is moved.

Figure 6:
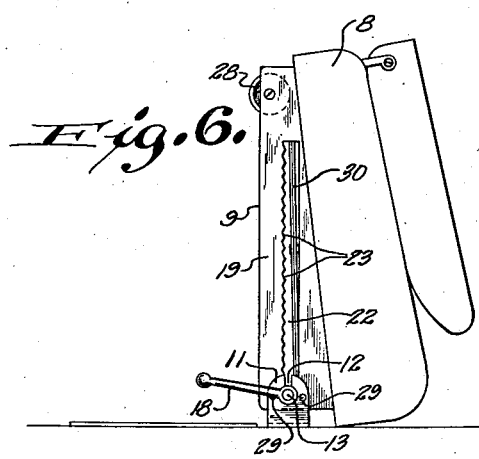
Fig. 6 is a side view showing the seat in a tilted position and on a smaller scale.

In normal use the seat is locked in a rear position, as shown in full lines in Fig. 1, or a slightly forward position to suit the driver. If access to the rear compartment of the vehicle is desired, the frame is unlocked and slid forwardly while the occupant remains in sitting position. It is also possible, if desired, to tilt the seat from its rear position, as shown in Fig. 6, the seat pivoting on the shaft 13. The lower flanges 27 prevent the seat from tilting in any position except the extreme rear position.

From the foregoing description it will be seen that the improved adjustable vehicle seat is of very simple and novel construction, and is well adapted for the purpose set forth.

What is claimed as the invention is:

1. A longitudinally movable vehicle seat, comprising a fixed bracket member, a frame portion slidably and pivotally connected directly therewith, a parallel motion mechanism connected with the bracket member and with the frame portion, and means for locking the frame portion in positions of longitudinal adjustment with respect to the bracket member.

2. A longitudinally movable vehicle seat, comprising a fixed bracket member, a frame portion slidably and pivotally connected directly therewith, a lazy tong mechanism connected at its end portions with the bracket member and with the frame portion, and means for locking the frame portion in positions of longitudinal adjustment with respect to the bracket member.

3. The combination with the floor portion of a vehicle, of a movable seat, comprising a bracket rigidly secured to said floor portion, a shaft carried by said bracket transversely of the seat, a frame engaging the floor portion and said shaft and slidably movable with respect to the same, means for preserving parallel movement of the frame, and means for releasably locking the frame to said shaft in adjusted positions.

4. The combination with the floor portion of a vehicle, of a movable seat, comprising a bracket rigidly secured to said floor portion, a shaft carried by said bracket transversely of the seat, a frame engaging said floor portion and formed with longitudinal slots through which said shaft extends transversely, the frame being movable with respect to the shaft, means for preserving parallel movement of the frame, and means for releasably locking the frame to said shaft in adjusted positions.

5. The combination with the floor portion of a vehicle, of a movable seat, comprising a bracket rigidly secured to said floor portion, a shaft carried by said bracket, rollers mounted on said shaft, a frame engaging said floor portion and formed with longitudinal slots through which said shaft extends, flanges formed adjacent said slots forming tracks which ride upon said rollers, means for preserving parallel movement of the frame, and means for releasably locking the frame to said shaft in adjusted positions.

6. The combination with the floor portion of a vehicle, of a movable seat, comprising a bracket rigidly secured to said floor portion, a shaft carried by said bracket, rollers eccentrically mounted on said shaft, a frame slidably engaging said floor portion at its rear end and formed with longitudinal slots through which said shaft extends, flanges formed adjacent said slots forming tracks for said rollers, means for preserving parallel movement of the frame, and means for revolving the shaft with respect to the eccentrically mounted rollers to vary its disposition within said slots for locking purposes.

7. The combination with the floor portion of a vehicle, of a movable seat, comprising a bracket rigidly secured to said floor portion, a shaft journaled in said bracket, rollers eccentrically mounted on said shaft, a frame slidably engaging said floor portion at its rear end and formed with longitudinal slots through which said shaft extends, said slots being formed with serrations, flanges formed adjacent said slots forming tracks for said rollers, means for preserving parallel movement of the frame, and means for revolving the shaft with respect to the eccentrically mounted rollers to cause a releasable engagement between the shaft and said serrations.

8. The combination with the floor portion of a vehicle, of a movable seat, comprising a bracket rigidly secured to said floor portion, a shaft journaled in said bracket, rollers eccentrically mounted on said shaft, a frame slidably engaging said floor portion at its rear end and formed with longitudinal slots through which said shaft extends, said slots being formed at their lower edges with serrations, flanges extending from said frame adjacent said slots and forming tracks which ride upon said rollers, a lazy tong mechanism secured at one end to said frame and at the other end to said shaft, and a crank secured to said shaft for manually turning the same to cause an engagement between the shaft and any of said serrations for locking purposes.

9. A longitudinally movable vehicle seat, comprising a support, a body portion, a shaft carried by the support and directly connecting the body portion thereto, the shaft forming a pivot, non-changeable as to position on which the body portion may be tilted to a position approximately at right angles to normal position, and means operative in a plurality of body positions for locking the body portion to the shaft.

10. A longitudinally movable vehicle seat, comprising a fixed bracket member, a frame portion movably associated therewith, a parallel motion mechanism connected with the bracket member and with the frame portion, and means for locking the frame portion in positions of adjustment with respect to the bracket member, said means comprising a roller eccentrically mounted with respect to the bracket member and means for moving said roller to cause a locking engagement between said bracket member and said frame portion.

11. A longitudinally movable vehicle seat, comprising a fixed bracket member, a shaft carried thereby, a roller eccentrically mounted on said shaft, a frame movable with respect to said shaft and formed with flanges and recesses, means for preserving parallel movement of the frame, and means for revolving the shaft with respect to the eccentrically mounted roller to vary the disposition of the shaft with respect to the frame to engage the shaft with any of said frame recesses.

12. A longitudinally movable vehicle seat, comprising a fixed bracket member, a shaft carried thereby, a roller mounted on said shaft, a frame movable with respect to said shaft and formed with longitudinal flanges adapted respectively to ride on said roller and to move under said roller, the lower flange serving to prevent any substantial vertical displacement of the forward end portion of said frame.

In testimony whereof, we affix our signatures.

HERMAN L. VAN VALKENBURG.
SWIFT MILLER.